United States Patent [19]
Chang

[11] Patent Number: 6,099,335
[45] Date of Patent: Aug. 8, 2000

[54] ELECTRICAL CARD CONNECTOR

[75] Inventor: Yao-Hao Chang, Chung-Ho, Taiwan

[73] Assignee: Hon Hai Precision Ind. Co., Ltd., Taipei Hsien, Taiwan

[21] Appl. No.: 09/302,697

[22] Filed: Apr. 30, 1999

[51] Int. Cl.[7] .................................................. H01R 29/00
[52] U.S. Cl. ........................................... 439/188; 439/607
[58] Field of Search .................................... 439/607, 188, 439/489, 326–329, 629–637

[56] References Cited

U.S. PATENT DOCUMENTS

| | | | |
|---|---|---|---|
| 5,259,777 | 11/1993 | Schuder et al. | 439/188 |
| 5,330,363 | 7/1994 | Gardner et al. | 439/188 |
| 5,334,827 | 8/1994 | Bleier et al. | 439/188 |
| 5,688,130 | 11/1997 | Huang | 439/607 |
| 5,800,192 | 9/1998 | David et al. | 439/188 |

*Primary Examiner*—Hien Vu
*Attorney, Agent, or Firm*—Wei Te Chung

[57] ABSTRACT

An electrical card connector includes a housing, a number of conductive contacts, a switch device, a number of signal contacts and a shielding device. The housing defines a base, a card receiving end, a number of contact receiving grooves, a number of switch contact receiving slots and two slots for receiving the conductive contacts, the switch device and the signal contacts therein, respectively. A mating card is inserted into the connector along the base plate. The switch device comprises a spring contact and a stationary contact received in an upper slot and a lower slot of the switch contact receiving slots, respectively, in order to provide a reliable switching control.

2 Claims, 5 Drawing Sheets

ELECTRICAL CARD CONNECTOR

BACKGROUND OF THE INVENTION

The present invention relates to an electrical card connector, and especially to an electrical card connector having a reliable and sensitive switch device for transmitting power to contacts of the card connector.

Electrical card connectors are usually equipped with a switch device for initializing power after a mating electrical card is properly positioned therein. Two terminals of a conventional switch device usually contact each other horizontally. A mating electrical card is inserted into the card connector to sequentially contact a spring terminal and then a fixed terminal thereby electrically connecting the mating card with the electrical card connector. The inserted mating electrical card moves in a distance along a horizontal direction and displaces the spring terminal to electrically contact the fixed terminal. Thus, strict requirements are placed on related manufacturing technologies and the resiliency of contacts. Auxiliary structures must be provided on the housing of the electrical card connector but accordingly increasing manufacturing costs. However, over displacement of the mating electrical card for electrically connecting the spring terminal with the fixed terminal may compromise the sensitivity and reliability of the electrical card connector.

BRIEF SUMMARY OF THE INVENTION

The main object of the present invention is to provide an electrical card connector having a reliable and sensitive switch device with a simple configuration.

According to the present invention, an electrical card connector for electrically mating an electrical card, comprises a housing, a plurality of contacts, a switch device, a plurality of signal contacts and a shielding device. The contacts, switch device and signal contacts are received in corresponding receiving structures of the housing. The shielding device encloses the electrical card connector. The switch device includes a spring contact and a stationary contact vertically offset from each other. When the mating electrical card is inserted into the electrical card connector, the spring contact is vertically displaced downward to engage with the stationary contact. Thus, power can be transferred to the contacts of the connector through a related circuit.

According to the present invention, the spring contact and the stationary contact of the switch device each comprise a connecting leg, a base and a contact arm. The contact arm of the spring contact forms an inclined free end for electrically contacting a mating electrical card. The contact section of the stationary contact forms a protrusion at a free end thereof for electrically contacting the contact section of the spring contact.

Other objects, advantages and novel features of the invention will become more apparent from the following detailed description when taken in conjunction with the accompanying drawings.

DETAILED DESCRIPTION OF THE PREFERRED EMBODIMENT

Figure 1:
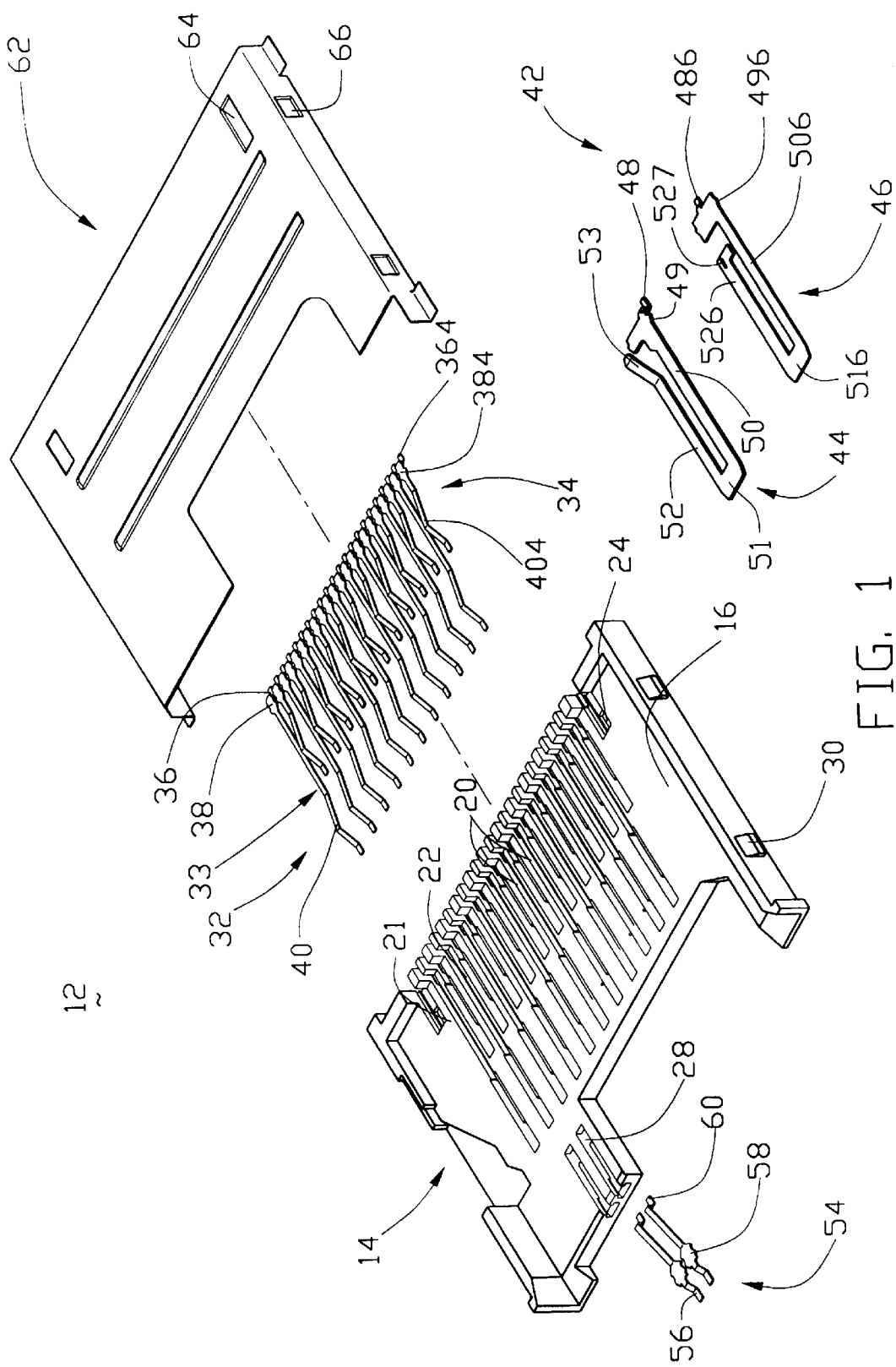
FIG. 1 is an exploded view of an electrical card connector in accordance with the present invention.
Figure 2:
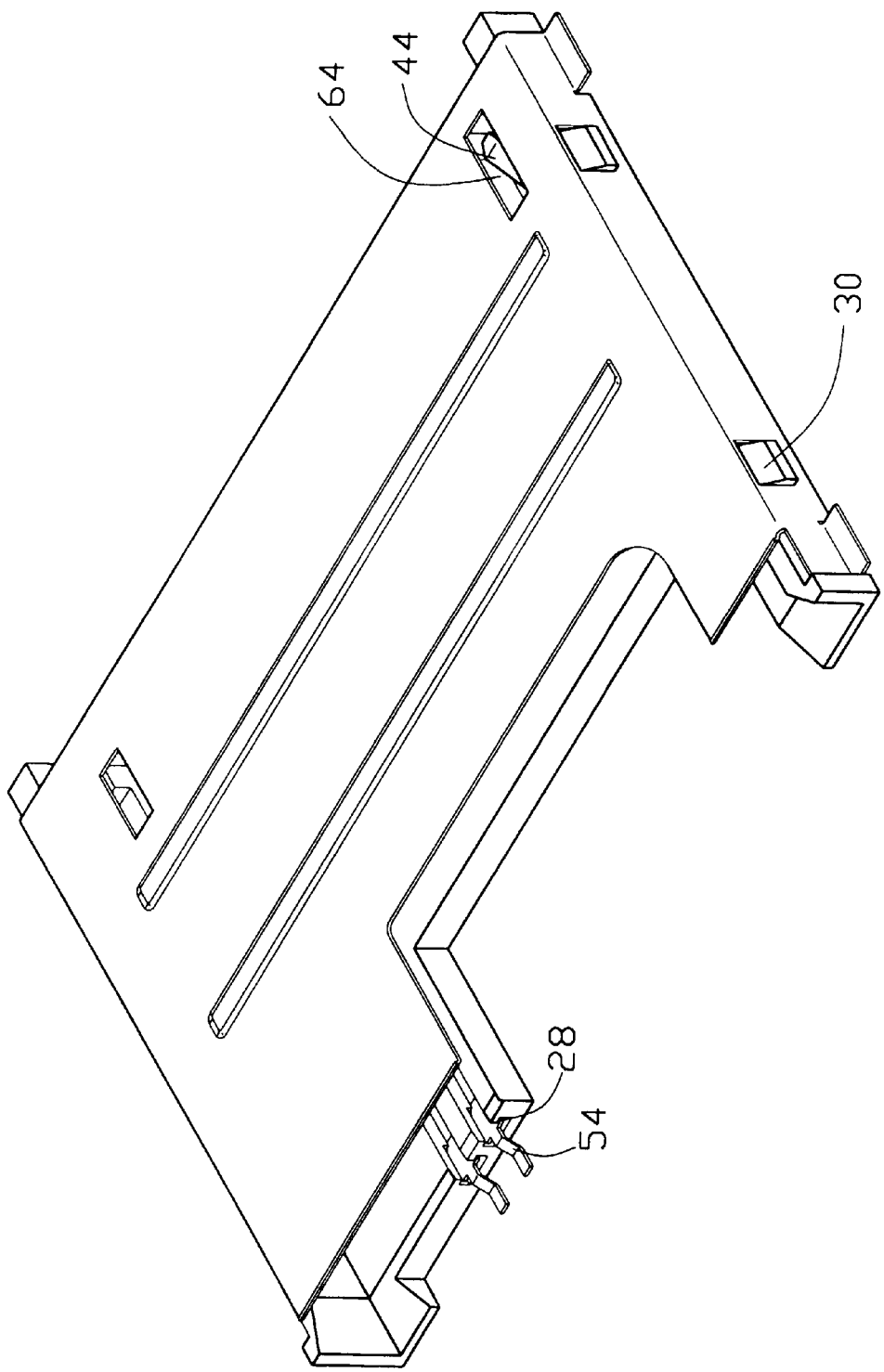
FIG. 2 is an assembled view of FIG. 1.
Figure 3:
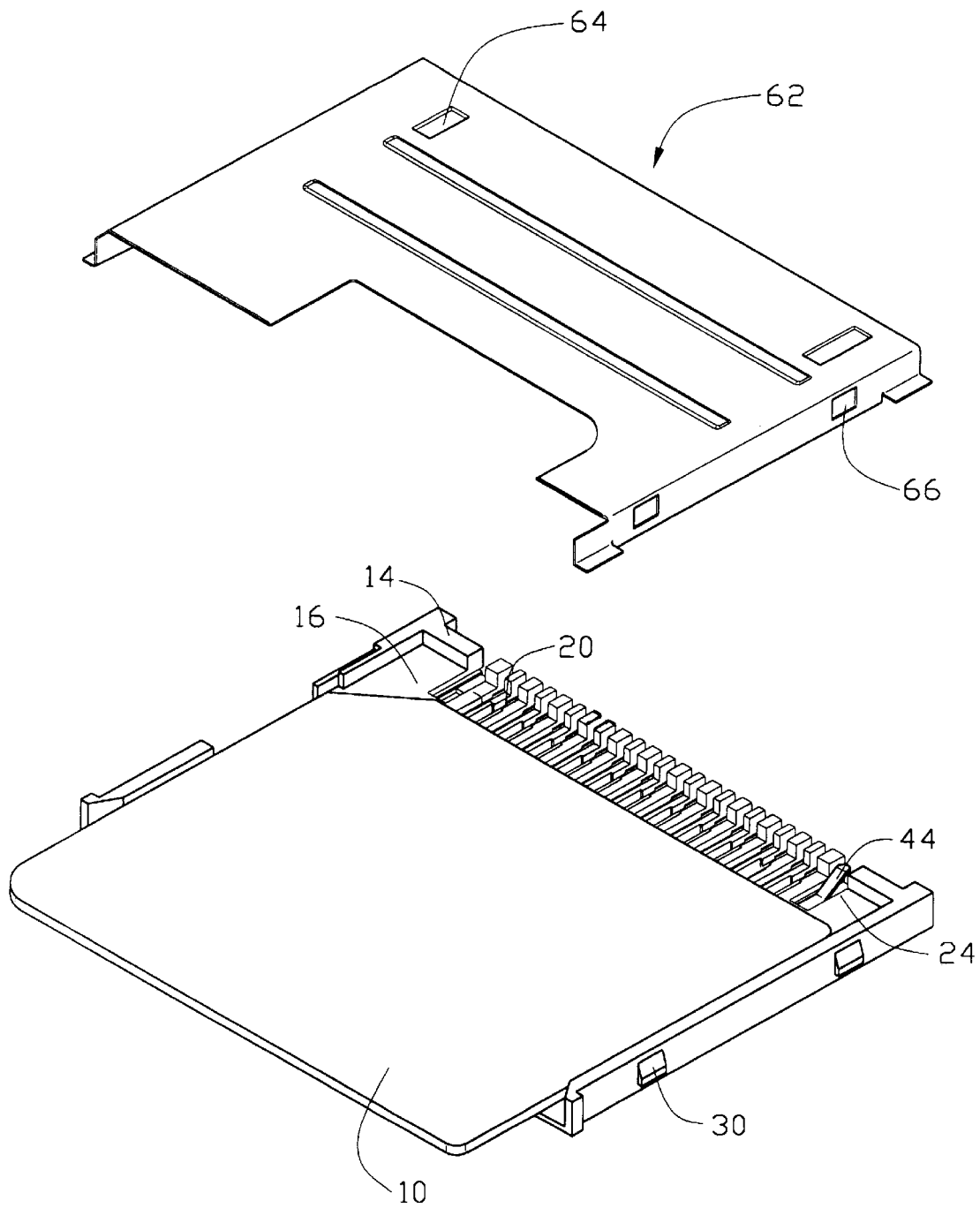
FIG. 3 is a perspective view of the electrical card connector mating with an electrical card wherein a shielding device is separated therefrom.
Figure 5:
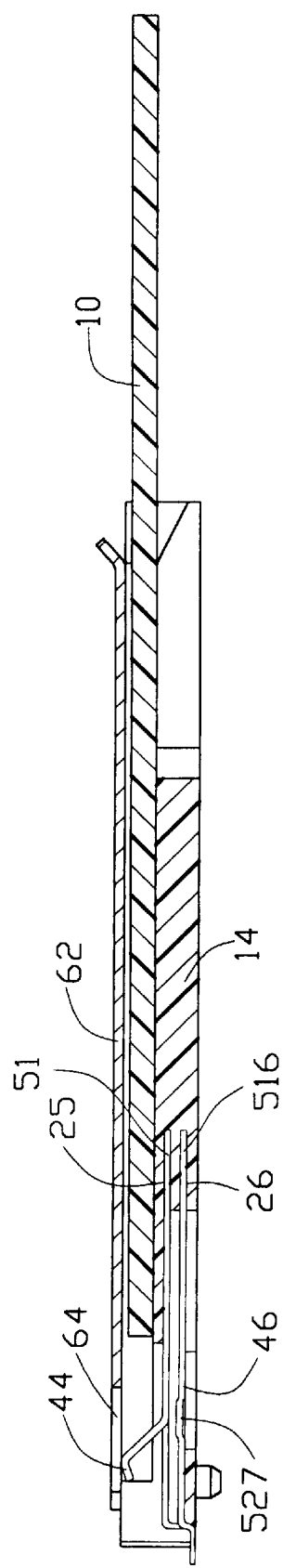
FIG. 5 is a cross sectional view taken along the line 5—5 in FIG. 4.

Referring to FIGS. 1, 2 and 3, an electrical card connector 12 in accordance with the present invention comprises a rectangular housing 14, a plurality of conductive contacts 32, a switch device 42, two signal contacts 54 and a shielding device 62. The housing 14 has a base plate 16 and a card receiving end (not labeled). A row of contact receiving grooves 20 are defined in the base plate 16 remote from the card receiving end wherein long grooves 21 are alternately arranged with short grooves 22 along a rear edge of the housing 14. A switch contact receiving slot 24 is defined on a distal of the card receiving end. The switch contact receiving slot 24 comprises an upper slot 25 and a lower slot 26 (FIG. 5). Two slots 28 are defined in the base plate 16 along a front edge thereof for receiving the signal contacts 54. A pair of projecting blocks 30 are each disposed on opposite sides of the housing 14 proximate opposite edges thereof.

The conductive contacts 32 comprise a plurality of long contacts 33 and a plurality of short contacts 34 received in the corresponding long grooves 21 and short grooves 22. Each contact 33 (34) includes a connecting section 36 (364), securing section 38 (384) and a contact section 40 (404) forming a free end for electrically contacting an electrical card 10. Furthermore, in assembly, the contact sections 404 of the short contacts 34 are proximate middle positions of the adjacent long contacts 33.

The switch device 42 comprise a spring contact 44 and a stationary contact 46. The spring contact 44 have a connecting leg 48, a base 50 and a contact arm 52, wherein the base 50 forms barbs 49 on opposite sides thereof proximate the leg 48 for interferentially fitting within the upper slot 25 of the switch contact receiving slots 24 as shown in FIG. 5, and a contact lead 53 is provided at a free end of the contact section 52 of the spring contact 44 for being displaced by the electrical card 10. The spring contact 44 forms a connecting section 51 connecting the base 50 with the contact section 52 and adapted to be fixedly fitted in the upper slot 25 of the switch contact receiving slot 24. The stationary contact 46 includes a connecting leg 486, a base 506 and a contact arm 526, wherein the base 506 forms barbs 496 on opposite sides thereof proximate the leg 486 for interferentially fitting within the lower slot 26 of the switch contact receiving slots 24 as shown in FIG. 5. The stationary contact 46 also forms a connecting section 516 connecting the base 506 with the contact arm 526 and adapted to be fixedly fitted in the lower slot 26 of the switch contact receiving slot 24. A protrusion 527 is formed on the contact arm 526 of the stationary contact 46 for engaging with the contact section 52 of the spring contact 44.

Each signal contact 54 includes an engaging section 56, a securing section 58 forming barbs on opposite sides thereof and a contact section 60 with a hooked end for facilitating connection with the electrical card 10.

Additionally, the shielding device 62 encloses the electrical card connector 12. An opening 64 is disposed at a position of the shielding device 62 corresponding to the switch receiving chamber 24 of the housing 14, and apertures 66 are formed on opposite sides of the shielding device 62 for engaging with the corresponding projecting blocks 30 of the housing 14.

Figure 4:
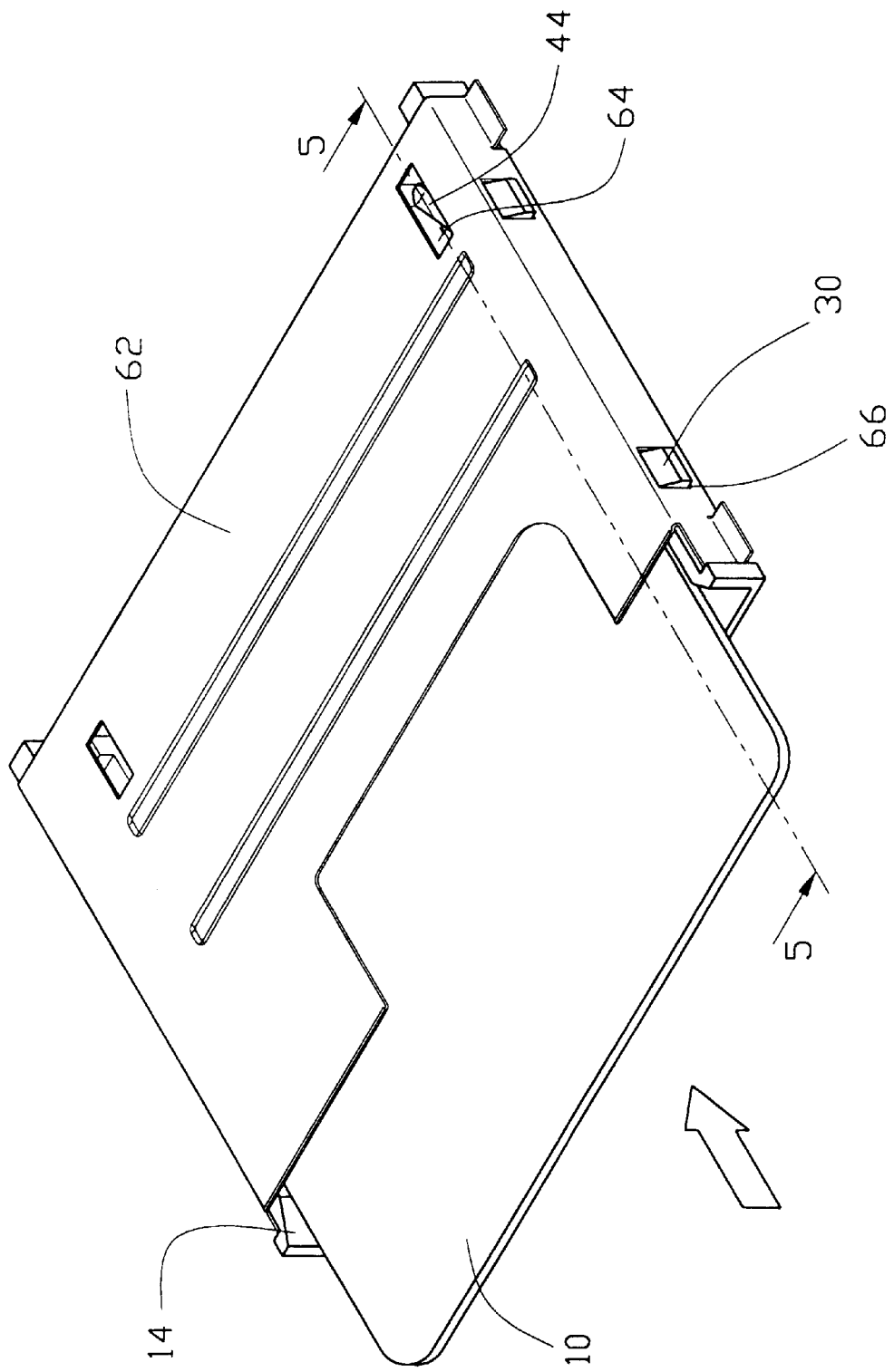
FIG. 4 is an assembled view of FIG. 3.

In assembly, the long contacts 33 and the short contacts 34 are received in the corresponding long grooves 21 and short grooves 22, respectively. Further referring to FIG. 5, the spring contact 44 and the stationary contact 46 are received in the upper slot 25 and lower slot 26 of the switch contact receiving slot 24, respectively. The signal contacts 54 are received in the corresponding slots 28. The shielding device 62 is then fixed to enclose the housing 14 by engagement between the apertures 66 and the corresponding projecting blocks 30, as shown in FIG. 4. Thus, the mating electrical card 10 can be inserted into the connector 12 along the base plate 16 to electrically contact with the switch contacts 54, the conductive contacts 32 and the spring contact 44. Furthermore, the card 10 contacts and then presses the contact lead 53 of the spring contact 44 downward to electrically contact the stationary contact 46 of the switch device 42 before being completely received in the connector 12. Thus, the contact section 52 of the spring contact 44 contacts the contact section 526 of the stationary contact 46 thereby transforming power between the related circuit and the electrical card 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:

a housing having a base with one end having a card receiving end and another end having a switch contact receiving slot, a plurality of contact receiving grooves formed in the base, said switch contact receiving slot distal from the card receiving end and having an upper slot and a lower slot in a superpositioned relationship;

a plurality of conductive contacts received in the contact receiving grooves;

a shield being fixed to shield the housing; and a switch device received in the switch contact receiving slot and including a spring contact positioned in the upper slot and a stationary contact positioned in the lower slot whereby the spring contact and the stationary contact are in a superpositioned relationship, the spring contact having a contact section at least partially extending above the base of the housing and the stationary contact having a contact section aligned under the contact section of the spring contact, the contact section of the spring contact being movable downward to electrically contact the contact section of the stationary contact upon pressing by insertion of a mating electrical card; wherein a plurality of projecting blocks are located on opposite sides of the housing, the shield having an opening corresponding to the switch contact receiving slot of the housing, and a plurality of apertures at opposite sides of the shield for engaging the corresponding projecting blocks of the housing.

2. The electrical card connector as claimed in claim 1, wherein the spring contact and the stationary contact each comprise a connecting leg adapted to be soldered to a PCB, a base and a connecting section connecting the base with the contact section, the base having barbs on opposite sides thereof for interferentially fitting with the housing and the connecting section being fixedly fitted within one of the upper and lower slots of the switch contact receiving slot, whereby each of the spring contact and the stationary contact is reliably and precisely fixed in position in the housing.

\* \* \* \* \*